(12) United States Patent
Hickman et al.

(10) Patent No.: US 8,566,844 B2
(45) Date of Patent: Oct. 22, 2013

(54) GENERALIZED EVENT AND RESPONSE SYSTEM (GEARS)

(75) Inventors: Bob Hickman, North Hollywood, CA (US); John Crocker, North Hollywood, CA (US); Jackson B. Dunstan, North Hollywood, CA (US)

(73) Assignee: Disney Enterprises, Inc., Burbank, CA (US)

(*) Notice: Subject to any disclaimer, the term of this patent is extended or adjusted under 35 U.S.C. 154(b) by 640 days.

(21) Appl. No.: 12/611,564

(22) Filed: Nov. 3, 2009

(65) Prior Publication Data

US 2011/0107353 A1     May 5, 2011

(51) Int. Cl.
*G06F 13/00*     (2006.01)

(52) U.S. Cl.
USPC ........................................................... 719/318

(58) Field of Classification Search
USPC ........................................................... 719/318
See application file for complete search history.

(56) References Cited

U.S. PATENT DOCUMENTS

| | | | |
|---|---|---|---|
| 7,516,481 B2 | 4/2009 | Fujikura | |
| 7,536,678 B2 | 5/2009 | Kothari | |
| 7,567,956 B2 | 7/2009 | Yu et al. | |
| 7,577,953 B1 | 8/2009 | Verego et al. | |
| 2008/0134214 A1* | 6/2008 | Goswami et al. | 719/318 |
| 2010/0088104 A1* | 4/2010 | DeRemer et al. | 705/1.1 |
| 2010/0257540 A1* | 10/2010 | Schuler et al. | 719/313 |

OTHER PUBLICATIONS

"Massively multiplayer online game".

* cited by examiner

*Primary Examiner* — Andy Ho
(74) *Attorney, Agent, or Firm* — Ference & Associates LLC

(57) ABSTRACT

Embodiments of the invention broadly provide a system configured to receive, process and broadcast generalized event notifications from components and provide these generalized event notifications (messages) to a predetermined set of subscriber components. Accordingly, embodiments of the invention broadly contemplate a messaging system providing increased system flexibility for implementing and managing changes in complex computing systems having one or more related system components.

20 Claims, 6 Drawing Sheets

GEARS SYSTEM MANAGER PUBLISH/BROADCAST LIST

| Module ID | Event | Prior Output | Publish/Broadcast |
|---|---|---|---|
| Module 1: | Action A/ Item X | Output A1 | $Action_{Item\ X}$; Module 1 |
| Module 1.1: | Action B/ Item X | Output B1 | $Action_{Item\ X}$; Module 1 |
| New Module 1.2 | Action B/ Item X | Output N1 | $Action_{Item\ X}$; Module 1 |
| Module 2 | Action A2/ Item Y | Output A2 | $Action_{Item\ Y}$; Module 2 |
| Module N | Action N1/ Item X | Output N | $Action_{Item\ X}$; Module N |

FIG. 5

GENERALIZED EVENT AND RESPONSE SYSTEM (GEARS)

BACKGROUND

Computing systems often have related/coupled components (program modules). An example of such computing systems is a Massive Multi-player Online (MMO) game system. Some such computing systems, for example MMO game systems, by their very nature have to change, adapt and evolve over time to be successful and, with respect to MMO game systems, to keep the "world economy" of the game working. Updating systems with related/coupled components, such as MMO game systems, using conventional methods is complex and time consuming because it consists of manually identifying, checking and updating all components affected by a changed and/or new component.

BRIEF SUMMARY

Embodiments of the invention broadly provide systems, apparatuses, methods and computer program products allowing for convenient change implementation in computing systems having related and/or coupled system components by providing one or more layers of abstraction or generalization to the system architecture. Various embodiments of the invention utilize a system manager as an intermediate to implement one or more layers of abstraction or generalization to communication between components of the system, permitting detailed changes to be implemented in one or more components of the system or components to be added or subtracted from the system without negatively affecting related/coupled components or requiring these related/coupled components be similarly updated.

In summary, one aspect of the invention provides an apparatus comprising: one or more processors; and a computer readable storage medium having computer readable code embodied therewith and executable by the one or more processors, the computer readable program code comprising: computer readable program code configured receive from one or more system components one or more indications of one or more specific component actions as one or more generalized event notifications; and computer readable program code configured to communicate the one or more generalized event notifications to one or more subscriber system components; wherein one or more changes in the one or more specific component actions does not change the one or more generalized event notifications.

Another aspect of the invention provides a method comprising: utilizing one or more processors of one or more machines to execute a program of instructions, the program of instructions comprising: computer readable program code configured receive from one or more system components one or more indications of one or more specific component actions as one or more generalized event notifications; and computer readable program code configured to communicate the one or more generalized event notifications to one or more subscriber system components; wherein one or more changes in the one or more specific component actions does not change the one or more generalized event notifications.

A further aspect of the invention provides a computer program product comprising: a computer readable storage medium having computer readable program code embodied therewith, the computer readable program code comprising: computer readable program code configured receive from one or more system components one or more indications of one or more specific component actions as one or more generalized event notifications; and computer readable program code configured to communicate the one or more generalized event notifications to one or more subscriber system components; wherein one or more changes in the one or more specific component actions does not change the one or more generalized event notifications.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 5 illustrates a publish/broadcast list of a system manager according to an embodiment of the invention.

DETAILED DESCRIPTION

Figure 1:
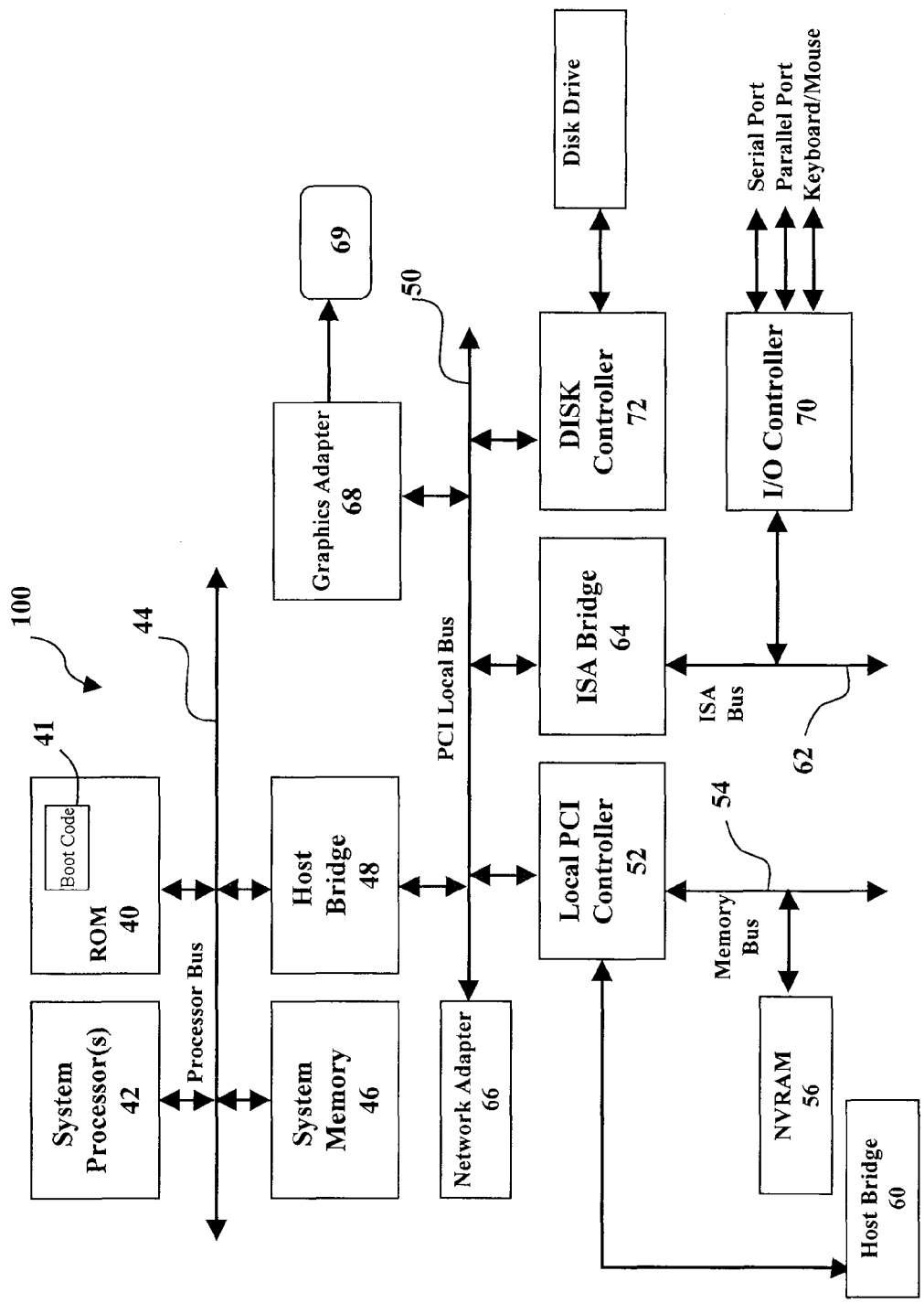
FIG. 1 illustrates a computer system according to an embodiment of the invention.

It will be readily understood that the components of the embodiments of the invention, as generally described and illustrated in the figures herein, may be arranged and designed in a wide variety of different configurations in addition to the described presently preferred embodiments. Thus, the following more detailed description of the embodiments of the invention, as represented in the figures, is not intended to limit the scope of the embodiments of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example to illustrate certain selected presently preferred embodiments of the invention as claimed herein.

The flowchart and block diagrams in the figures illustrate the architecture, functionality, and operation of possible implementations of systems, methods and computer program products according to various embodiments of the invention.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that although discussion of embodiments of the invention as described herein focus in large part on MMO game systems, the description presented herein is non-limiting and simply highlights certain aspects of the invention. Accordingly, those skilled in the art will recognize that embodiments of the invention are equally applicable to other computing systems in addition to the exemplary embodiments described with reference to MMO game systems.

Ongoing changes to systems with related/coupled components ("component(s)" and "program module(s)" are used interchangeably herein), such as an MMO game system, are highly desirable to facilitate the best system experience for the users, for example users of the MMO game system. The inventors have recognized that a main problem with implementing changes in systems with related (and/or coupled) components, such as those of an MMO game system, is that these ongoing changes generally require a large amount of maintenance programming to accomplish. This is because the components of such systems are interrelated and become coupled, reliant on one another, often as a result of direct communication between components. As such, changes in one component in such systems often necessarily affects other related/coupled components, thereby necessitating changes in the related/coupled components. Unfortunately, this often makes change implementation un-scalable. Thus, the inventors have recognized a need for one or more centralized messaging control systems (referred to herein as "system manager") which solves these and related problems.

The description now turns to the figures and select, presently preferred embodiments of the invention will be described. The following description of various embodiments of the invention is presented to highlight certain aspects of the invention, and the scope of the claimed embodiments of the invention will be pointed out in the appended claims.

Referring now to FIG. 1, there is depicted a block diagram of an illustrative embodiment of a computer system 100. The illustrative embodiment depicted in FIG. 1 may be an electronic device such as a desktop computer, a workstation computer, a mobile computing device such as a netbook or a smart phone and the like. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse and serial and parallel ports, et cetera. A disk controller 72 connects a disk drive with PCI local bus 50. The USB Bus and USB Controller (not shown) are part of the Local PCI controller (52).

Figure 2:
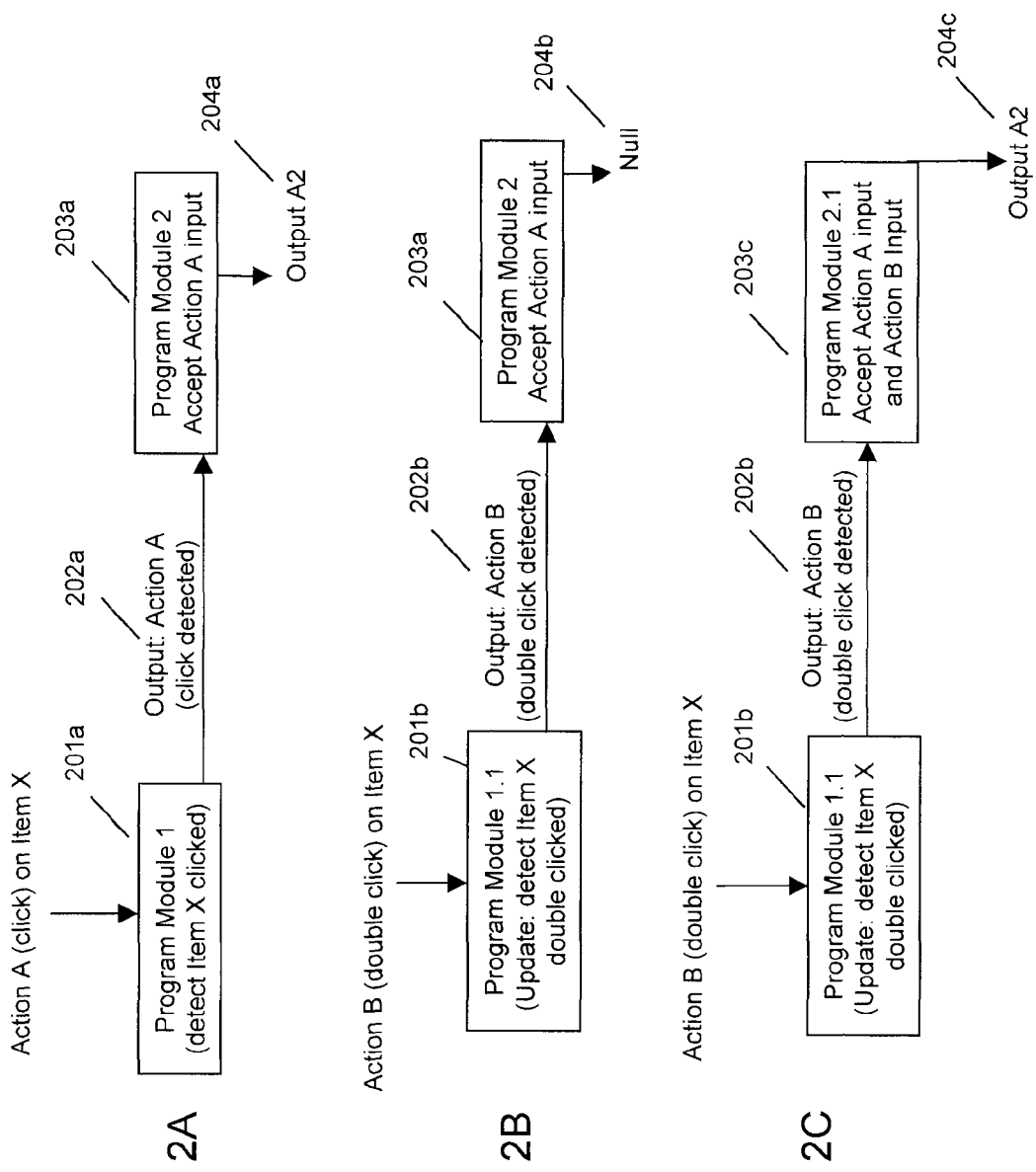
FIG. 2 (A-C) illustrates conventional change implementation of related components.

Referring to FIG. 2 (A-C), conventional updating of related components is illustrated. As shown in FIG. 2A, an action on an item X, for example a user click on a game icon/graphic, is input into a component (here, Program Module 1, 201a). The component 201a takes this input and performs some predetermined processing and provides one or more outputs (here, Output: Action A (click detected), 202a) to another, related component (here, Program Module 2, 203a). The related component is configured to take the output 202a produced by the first component 201a as input. After performing some predetermined processing, the related component produces its own output (here, Output A2, 204a).

However, it is often necessary and/or desirable to make one or more changes to a component within the system that ultimately changes the nature of the output(s) produced by one or more components. This is often the case for example in MMO game systems, where components are frequently updated to improve the gaming environment.

Thus, Referring to FIG. 2B, a change has been implemented changing component 201a into component 201b (here, Program Module 1.1). Accordingly, the output produced by the component 201b differs from that of component 201a (here, Output Action B (double click detected), 202b). Notably the related component has not yet been identified as related and updated accordingly in FIG. 2B. Thus, the related component (here, Program Module 2, 203a) is not properly configured to accept as input 202b, and thus the desired/expected result is not produced. Rather an unexpected or error result is produced (here, Null 204b). This is because the components of such systems are interrelated and become coupled, reliant on one another for the appropriate input, often as a result of direct communication between components. As such, changes in one component in such systems often necessarily affects other related/coupled components, thereby necessitating changes in the related/coupled components.

Referring to FIG. 2C, a conventional approach is illustrated, wherein the related component 203a must be changed (here, to Program Module 2.1, 203c) in order to properly handle the changed output 202b of the changed component 201b. Unfortunately, this change implementation is cumbersome and unscalable. The components that are changed must be painstakingly matched to the components they are related to and the changes implemented must be checked against their putative effects on other, related/coupled components. As will be appreciated by one having skill in the art, what appears to be a relatively simple change at first can become a large, time consuming set of tasks.

Accordingly, embodiments of the invention provide one or more system managers that provide for a generalized event and response system (GEARS), thus providing convenient change implementation in systems having related/coupled components. Embodiments of the invention are particularly advantageous for relatively complex systems that rely in part on their flexibility, such as MMO game systems. Unlike platform games that incorporate more static (pre-programmed) game behaviors, a casual MMO game system requires frequent and ongoing updates and changes to game behaviors like game balancing, new gameplay and interactions. This flexibility is crucial to the success and ongoing support of the MMO game system. The flexibility allows content producers to create interactions that will support the required experience.

Using embodiments of the invention, such flexibility can be realized without the support of technical staff or changes to the core gameplay systems. Thus, embodiments of the invention allow for interactions, triggers, rewards, and achievement milestones to be modified and balanced as required, and new behavior can be added at will. A generalized event and response system according to embodiments of the invention supports a number of ways to describe interactions, rewards, et cetera, from a basic (but expandable) XML rule set up to more detailed interactions using a high level scripting language. Moreover, a multi-layer approach is provided where one layer provides more structured rule sets for setting behaviors in XML while another layer provides a scripting capability enabling deeper flexibility in defining game behaviors.

Still further, a generalized event and response system according to embodiments of the invention keeps all game components modularized (in as much as they are only aware of themselves and the generalized event and response system (system manager) but no other components). According to embodiments of the invention, every event in the game flows through the generalized event and response system and is passed on to the correct modules (including routing important messages to a server component), allowing developers to keep the components connected with a pre-agreed protocol without the components having to know about each other. Accordingly, embodiments of the invention give developers the ability to build scalable modules/components and even swap them out with other components that follow the same protocol. Thus, while previous XML driven solutions internally have provided a mechanism to abstract basic data parameters, these do not incorporate the ability to update more complex rules or a scripting ability, for example a game scripting ability. Accordingly, embodiments of the invention provide a rich and extensive tool set to create game behaviors rapidly with no updates to core game systems or applications.

Figure 3:
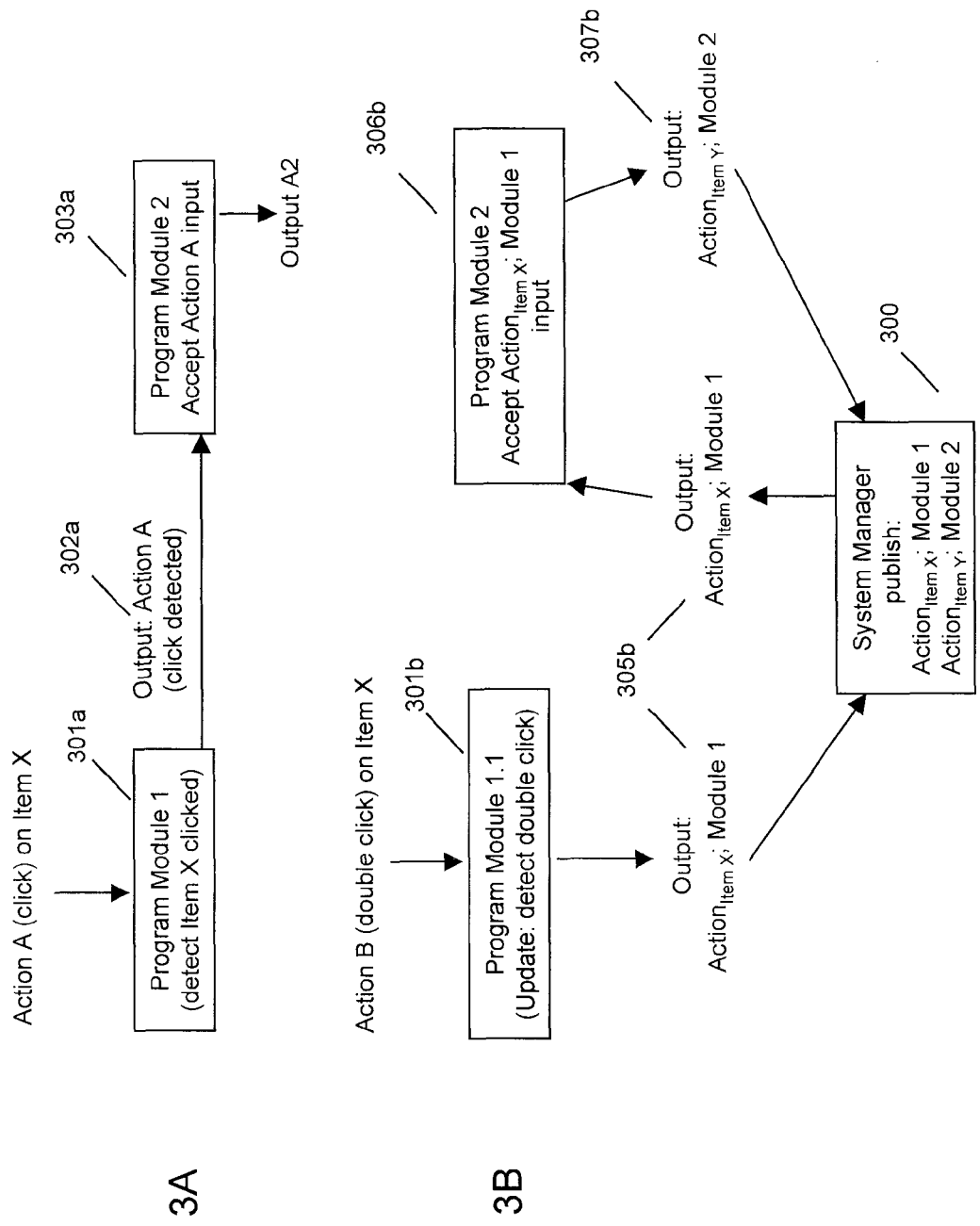
FIG. 3 (A-B) illustrates related component change implementation according to an embodiment of the invention.

Referring to FIG. 3 (A-B), an embodiment of the invention for implementing change management is illustrated. In FIG. 3A, again an action, here illustrated as Action A, a click on Item X, is received as input by a component 301*a* (Program Module 1). The component 301*a* is configured to detect Item X has been clicked and communicate this as output 302*a* Action A to a coupled component 303*a* (Program Module 2). The coupled component 303*a* accepts 302*a* Action A as input and after some processing provides an output A2. However, as described herein, a change to the first component 301*a* will create problems for related/coupled components, such as component 303*a*.

Accordingly, in FIG. 3B the changed/updated component, 301*b* (Program Module 1.1) now detects a different action on Item X, here a double click (Action B). Here, direct communication of Action B to component 303*a* would not be acceptable, as component 303*a* has not been updated and is not configured to accept Action B as input.

Thus, embodiments of the invention allow components such as 301*b* to be updated, for example using a game scripting language, yet communicate with related/coupled components, such as component 306*b* (Program Module 2), via a generalized and predetermined communication protocol, preferably managed by an intermediate, here system manager 300.

Thus, according to embodiments of the invention, component 301*b* is configured to provides as output not the refined, detailed action detected but rather a generalized output according to a predetermined protocol comprising an Event/Action Item ID and a Module ID. Thus, component 301*b* provides output 305*b* (Output: Action$_{Item\ X}$; Module 1) as a generalized output to the system manager 300. Thus, component 301*b* has indicated that an action 305*b* has taken place involving Item X at Program Module 1, yet the details of the action are not communicated to 306*b* (Program Module 2). Rather, the fact that an action on Item X 405*b* has taken place is provided to the system manager 300, which can in turn provide/communicate this information to related components that are to act in response to such action, for example related component 306*b*. Thus, related component 306*b* is not directly coupled to component 301*b*, and thus local changes to component 301*b* will not negatively influence related component 306*b*.

According to embodiments of the invention, system components, for example component 301*b* and related component 306*b*, are configured to communicate via a predetermined and generalized protocol. Thus, component 306*b* is likewise configured to communicate that it has detected an action generally via output 307*b* (Output: Action$_{Item\ Y}$; Module 2). Thus, components related to and/or depending on output from component 306*b* (not shown) will not be affected if the underlying action detected is changed, for example making a different action detection a part of game play.

The system manager 300 according to embodiments of the invention is configured to publish/broadcast the messages received from the system components. Thus the system manager 300 publishes that component 301*b* and 306*b* have provided outputs Action$_{Item\ X}$; Module 1 and Action$_{Item\ Y}$; Module 2. Thus, components related to these components (subscriber components, discussed further herein) can be provided proper inputs for initiating their prescribed actions. As a non-limiting example, system manager 300 receives Action$_{ItemX}$; Module 1 and then notifies modules subscribed to the system manager 300 to receive notifications from that module ID (Module 1) and/or notifications regarding that item (Item X). Here, component 306*b* is one such subscribed component related to 301*b*.

Figure 4A:
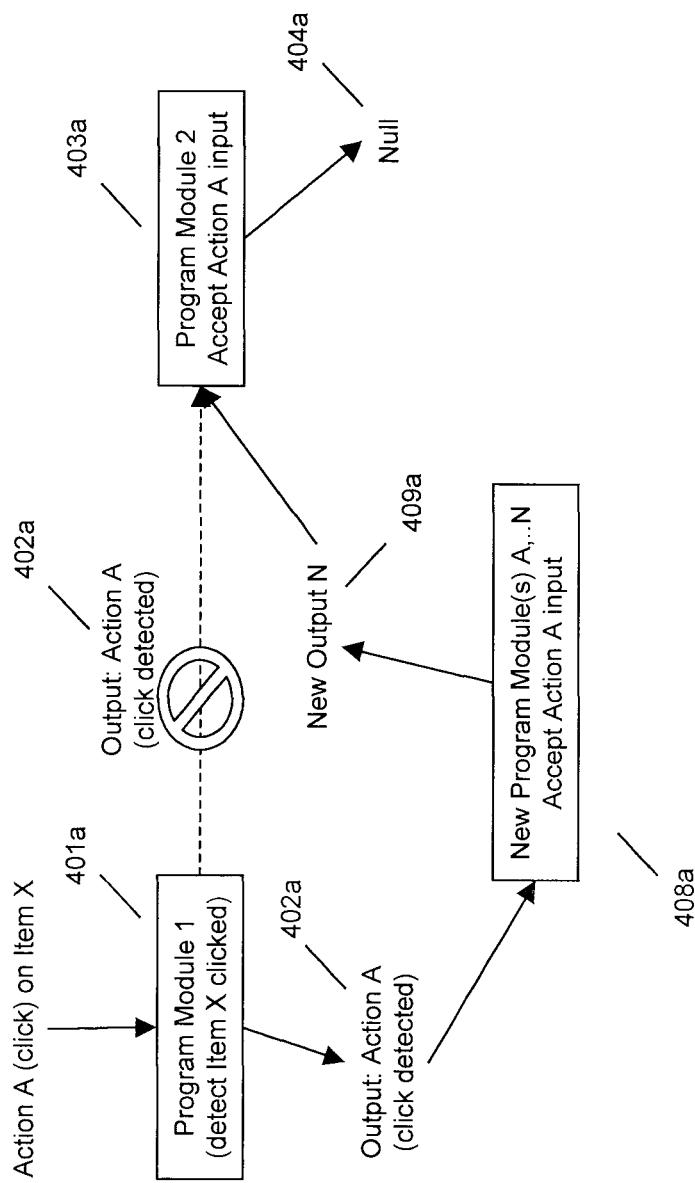
FIG. 4 (A-B) illustrates new component implementation according to an embodiment of the invention.

FIG. 4A illustrates related difficulties with implementing new modules in a system having related/coupled components. As shown, an action (click on Item X) is detected by a component 401*a*. The component, normally configured to communicate to a coupled component 403*a* that the (click) action has been detected (Output: Action A), is rather configured to provide that output to a new component 408*a*. The new component 408*a* is intended to provide a new, intermediate output to component 403*a*. However, this necessitates changing component 403*a* to accept the new output 409*a* from the new component 408*a*. However, absent identification of 403*a* as a coupled component and appropriate updating/changing, component 403a will not accept the new output 409a and the result will be an error (Null 404a).

Figure 4B:
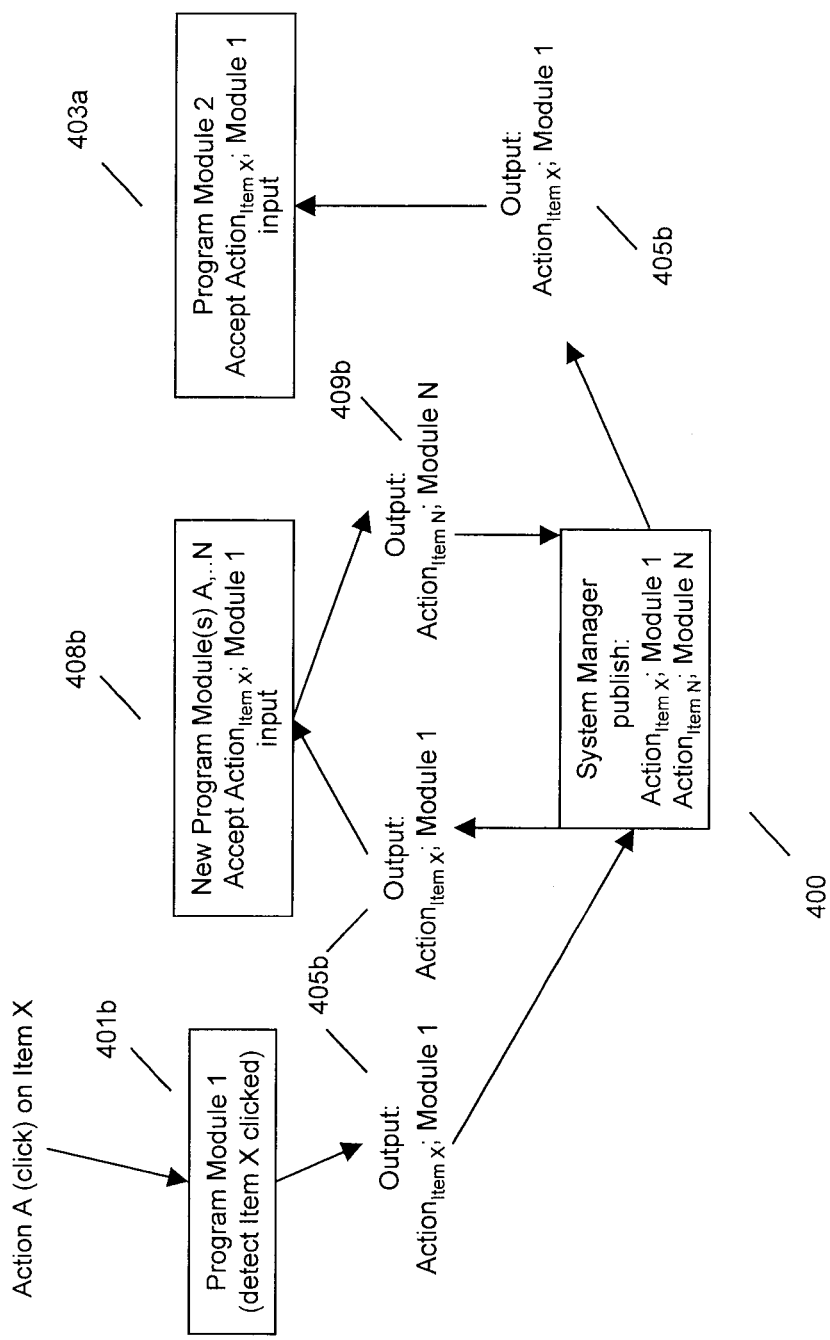

Accordingly, embodiments of the invention provide the flexibility to add new components to the system without disrupting related components. As illustrated in FIG. 4B, a first component 401b, a new component 408a, and a second related component 403a are provided. In contrast to FIG. 4A, notably the components are configured to utilize a generalized event and response system, governed by a system manager 400, such that the system components are not aware of one another.

Accordingly, component 401b is configured to provide a generalized notice of an event 405b, Action$_{ItemX}$: Module 1, which is communicated to the system manager 400. Accordingly, modules interested in this event 405b can subscribe to the system manager for publication of this event 405b notification, such as new component 408b and component 403a. This avoids any updating of related components due to the addition of a new module such as 408b. Moreover, the new module's 408b output 409b can be communicated utilizing a generalized notification 409b and published by the system manager 400 to those modules that are related and/or reliant on such an output.

Referring to FIG. 5, a table illustrates a non-limiting example of a publication/broadcast list of a system manager according to an embodiment of the invention. As discussed herein, the system manager enables a generalized event and response system according to embodiments of the invention. The system manager is configured to receive messages from the components of the system and act as an intermediate, such that the components are no longer reliant on direct communications between one another. The system manager, in response to receiving the message(s), prepares the messages for communication (publication and/or broadcast) to related components that have subscribed.

Illustrated in FIG. 5 is a table indicating the information utilized by the system manager according to an embodiment of the invention. For example, the publish/broadcast list includes the Module ID of the component that has sent the notification/message to the system manager. The publish/broadcast list also includes an event field, indicating the action that has taken place at the component. Moreover, the publish/broadcast list also optionally includes a record of the prior output for that module, which may be useful to programmers interested in the history of change at the given component(s).

The publish/broadcast list makes available (publishes) the appropriate generalized output for the subscriber related components according to embodiments of the invention. Thus, the generalized output/notifications may be broadcast to the related components by the system manager in response to receipt by the system manager of the messages. It will be appreciated by those having ordinary skill in the art that publication and/or broadcasting (more generally, communicating) the messages to the appropriate related components can be accomplished in a variety of ways, for example sending the generalized messages via the system manager to a predetermined set of subscriber modules via an appropriate network connection. Alternative communications, such as having the subscriber modules poll the system manager, are also possible.

In brief recapitulation, embodiments of the invention broadly provide an intermediate device, such as the system manager described herein, to receive, process and broadcast generalized event notifications (messages regarding events) from related components of a system and provide these generalized event notifications (messages) to a predetermined set of subscriber components. Accordingly, embodiments of the invention broadly contemplate a messaging system providing increased system flexibility for implementing and managing changes in complex computing systems.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of foams, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The invention claimed is:

1. An apparatus comprising:
   one or more processors; and
   a computer readable storage medium having computer readable code embodied therewith and executable by the one or more processors, the computer readable program code comprising:
   computer readable program code configured to receive from a system component a generalized event notification responsive to a component action;
   computer readable program code configured to receive from the system component the generalized event notification responsive to an updated component action; and
   computer readable program code configured to communicate the generalized event notification to one or more subscriber system components after occurrence of one or more of the component action and the updated component action.

2. The apparatus according to claim 1, wherein the generalized event notification further comprises an Event ID and a Module ID associated with the system component.

3. The apparatus according to claim 1, wherein the system component comprises a game module.

4. The apparatus according to claim 1, wherein the component action comprises one or more gaming actions.

5. The apparatus according to claim 4, wherein the updated component action comprises one or more changes to the one or more gaming actions.

6. The apparatus according to claim 3, wherein the one or more subscriber system components further comprise one or more game modules related to one or more system components sending generalized event notifications.

7. The apparatus according to claim 1, wherein the generalized event notification conforms to a predetermined scripting language rule set utilized by one or more system components and the one or more subscriber system components.

8. The apparatus according to claim 7, wherein the component action is executed according to one or more scripting languages.

9. A method comprising:
   utilizing one or more processors of one or more machines to execute a program of instructions, the program of instructions comprising:
   computer readable program code configured to receive from a system component a generalized event notification responsive to a component action;
   computer readable program code configured to receive from the system component the generalized event notification responsive to an updated component action; and
   computer readable program code configured to communicate the generalized event notification to one or more subscriber system components after occurrence of one or more of the component action and the updated component action.

10. The method according to claim 9, wherein the generalized event notification further comprises an Event ID and a Module ID associated with the system component.

11. The method according to claim 9, wherein the system component comprises a game module.

12. The method according to claim 9, wherein the component action comprises one or more gaming actions.

13. The method according to claim 12, wherein the updated component action comprises one or more changes to the one or more gaming actions.

14. The method according to claim 9, wherein the one or more subscriber system components further comprise one or more game modules related to one or more system components sending generalized event notifications.

15. The method according to claim 9, wherein the generalized event notification conforms to a predetermined scripting language rule set utilized by one or more system components and the one or more subscriber system components.

16. The method according to claim 15, wherein the component action is executed according to one or more scripting languages.

17. A computer program product comprising:
   a computer readable storage medium having computer readable program code embodied therewith, the computer readable program code comprising:
   computer readable program code configured to receive from a system component a generalized event notification responsive to a component action;
   computer readable program code configured to receive from the system component the generalized event notification responsive to an updated component action; and computer readable program code configured to communicate the generalized event notification to one or more subscriber system components after occurrence of one or more of the component action and the updated component action.

18. The computer program product according to claim 17, wherein the generalized event notification further comprises an Event ID and a Module ID associated with the system component.

19. The computer program product according to claim 17, wherein the system component comprises a game module.

20. The computer program product according to claim 17, wherein the component action comprises one or more gaming actions.

* * * * *